(12) United States Patent
Lavertu et al.

(10) Patent No.: US 11,760,335 B2
(45) Date of Patent: Sep. 19, 2023

(54) METHODS AND SYSTEMS FOR A HYBRID ENGINE SYSTEM

(71) Applicant: Transportation IP Holdings, LLC, Norwalk, CA (US)

(72) Inventors: Thomas Michael Lavertu, Ballston Lake, NY (US); Adam Edgar Klingbeil, Ballston Lake, NY (US); Kevin McElhaney, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 29 days.

(21) Appl. No.: 17/452,385

(22) Filed: Oct. 26, 2021

(65) Prior Publication Data
US 2023/0125484 A1   Apr. 27, 2023

(51) Int. Cl.
| | | |
|---|---|---|
| *B60W 20/13* | (2016.01) | |
| *B60W 10/06* | (2006.01) | |
| *F02B 39/10* | (2006.01) | |
| *F02D 41/00* | (2006.01) | |
| *B60W 10/30* | (2006.01) | |
| *B60W 40/02* | (2006.01) | |
| *F04D 25/06* | (2006.01) | |
| *H02J 7/14* | (2006.01) | |
| *B60W 10/08* | (2006.01) | |
| *H02J 7/00* | (2006.01) | |

(52) U.S. Cl.
CPC ............ *B60W 20/13* (2016.01); *B60W 10/06* (2013.01); *B60W 10/08* (2013.01); *B60W 10/30* (2013.01); *B60W 40/02* (2013.01); *F02B 39/10* (2013.01); *F02D 41/0007* (2013.01); *F04D 25/06* (2013.01); *H02J 7/14* (2013.01); *B60W 2510/244* (2013.01); *H02J 7/0047* (2013.01)

(58) Field of Classification Search
CPC ...... B60W 20/13; B60W 10/06; B60W 10/08; B60W 10/30; B60W 40/02; B60W 2510/244; F02B 39/10; F02D 41/0007; F04D 25/06; H02J 7/14
See application file for complete search history.

(56) References Cited

U.S. PATENT DOCUMENTS

| | | | |
|---|---|---|---|
| 6,664,651 B1 * | 12/2003 | Kotre ................... | F02N 11/084 290/34 |
| 2013/0255251 A1 * | 10/2013 | Tanaka .................. | F02M 26/07 60/605.2 |
| 2013/0255647 A1 * | 10/2013 | Akashi .................... | F02B 33/34 123/559.1 |
| 2019/0003408 A1 * | 1/2019 | Hata ....................... | F02B 39/10 |
| 2019/0128195 A1 * | 5/2019 | Lee ...................... | F02D 41/0007 |
| 2019/0143821 A1 * | 5/2019 | Bell ....................... | B60W 10/08 180/65.225 |
| 2019/0276004 A1 * | 9/2019 | Takasu .................. | B60W 20/13 |

(Continued)

OTHER PUBLICATIONS

NIST Special Publication 800-82 Revision 2 (Year: 2015).*

*Primary Examiner* — Carl C Staubach
(74) *Attorney, Agent, or Firm* — McCoy Russell LLP

(57) ABSTRACT

Various methods and systems are provided for a method for a hybrid engine system. In one example, the method includes operating an electrical turbocharger to modify engine operating efficiency and to extend battery charge over a duration of a travel route based on a real-time status of the battery charge. The method allows fuel consumption to be decreased while meeting power demands of vehicle navigation.

20 Claims, 6 Drawing Sheets

(56) References Cited

U.S. PATENT DOCUMENTS

| | | | |
|---|---|---|---|
| 2021/0046919 A1* | 2/2021 | Choi | B60L 15/2045 |
| 2021/0155225 A1* | 5/2021 | Choi | F02D 41/0055 |
| 2022/0080950 A1* | 3/2022 | Lee | B60W 10/08 |

* cited by examiner

METHODS AND SYSTEMS FOR A HYBRID ENGINE SYSTEM

BACKGROUND

Technical Field

Embodiments of the subject matter disclosed herein relate to a hybrid engine system and a method for optimizing power and efficiency of the hybrid engine system.

Discussion of Art

Vehicles, such as rail vehicles, may utilize a hybrid engine system for propulsion. The hybrid engine system may allow vehicle navigation to be driven by torque produced through fuel combustion at an engine and/or by electrical power derived from an energy storage device, such as a battery. An electric turbocharger may also be included in the hybrid engine system to increase responsiveness of the engine to demands for increased torque, increase efficiency of the hybrid engine system, and enable replenishing of battery charge. For example, the electric turbocharger may mitigate turbo lag by providing electrically-assisted spooling of a turbine shaft when exhaust pressure is too low to meet a torque demand. Additionally, the electric turbocharger may act as a generator during certain conditions to convert mechanical energy into electrical energy to charge the battery. The electric turbocharger may improve an energy efficiency of the hybrid engine system by increasing an overall expansion ratio, which may allow for increased mechanical energy extraction for a given amount of fuel. Furthermore, the energy efficiency may be increased as a result of the electric turbocharger operating as a generator during events during which a wastegate, variable geometry turbine, or other device may otherwise be actuated to circumvent overspeed of the electric turbocharger or overboosting of the engine.

BRIEF DESCRIPTION

In one embodiment, a method for a hybrid engine system includes operating an electrical turbocharger to modify engine operating efficiency and to extend battery charge over a duration of a travel route based on a real-time status of the battery charge. In this way, engine power may be supplemented by the electrical turbocharger, allowing downsizing of the engine, while circumventing demand for a larger battery to compensate.

In one example, operation of the electrical turbocharger may be adjusted to increase an operating efficiency of the engine. Propulsion based on battery power may be prioritized under certain conditions to minimize fuel consumption and release of associated emissions. A mode of hybrid engine system operation may vary according to a travel distance and real-time battery state of charge providing a balance between engine-based propulsion and battery-based propulsion. Operation of the hybrid engine system may therefore be adjusted in real-time based on current vehicle and route conditions using a low cost and efficient strategy.

DETAILED DESCRIPTION

Figure 1:
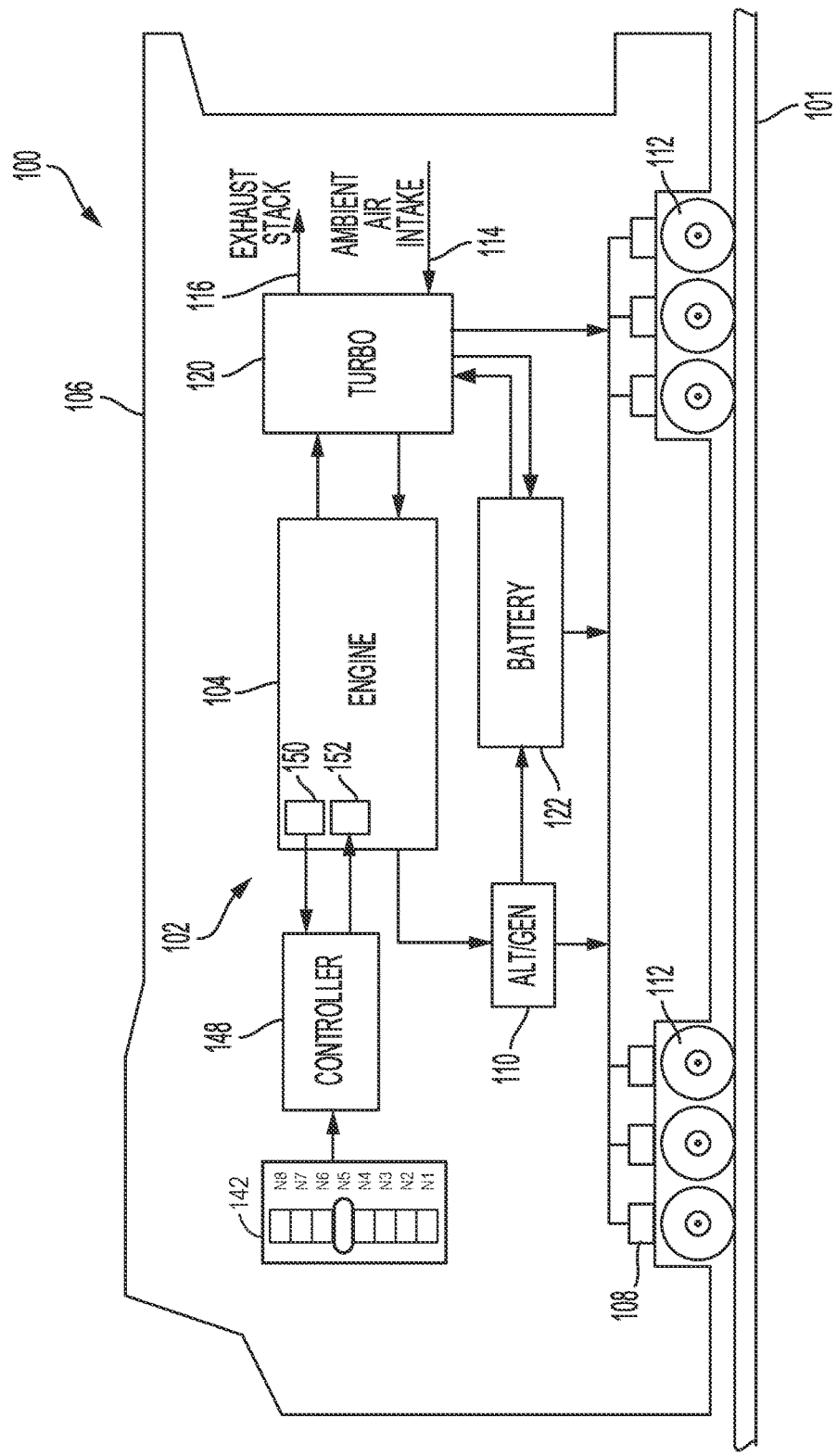
FIG. 1 shows a schematic diagram of a vehicle with a hybrid engine system including an electric turbocharger, according to an embodiment.
Figure 2:
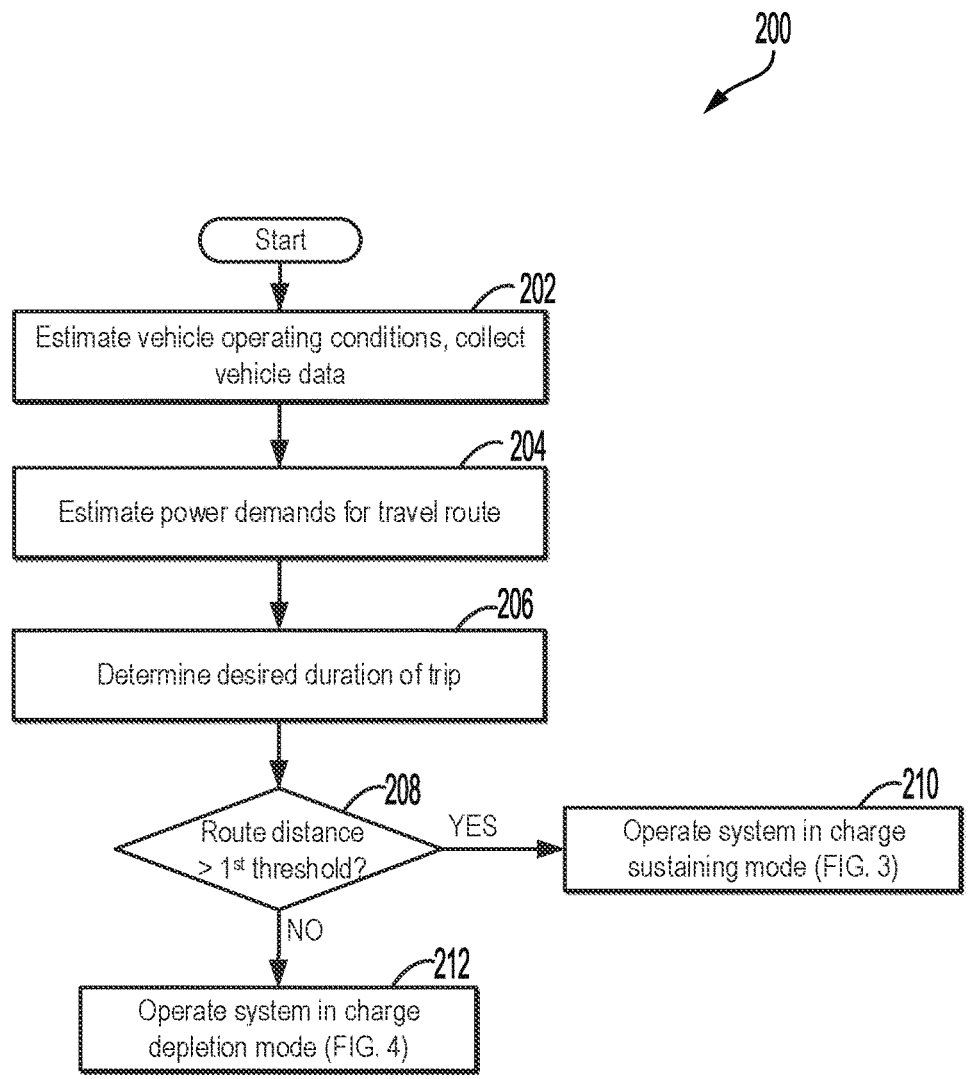
FIG. 2 shows a high level example of a routine for operating the hybrid engine system of FIG. 1.
Figure 3:
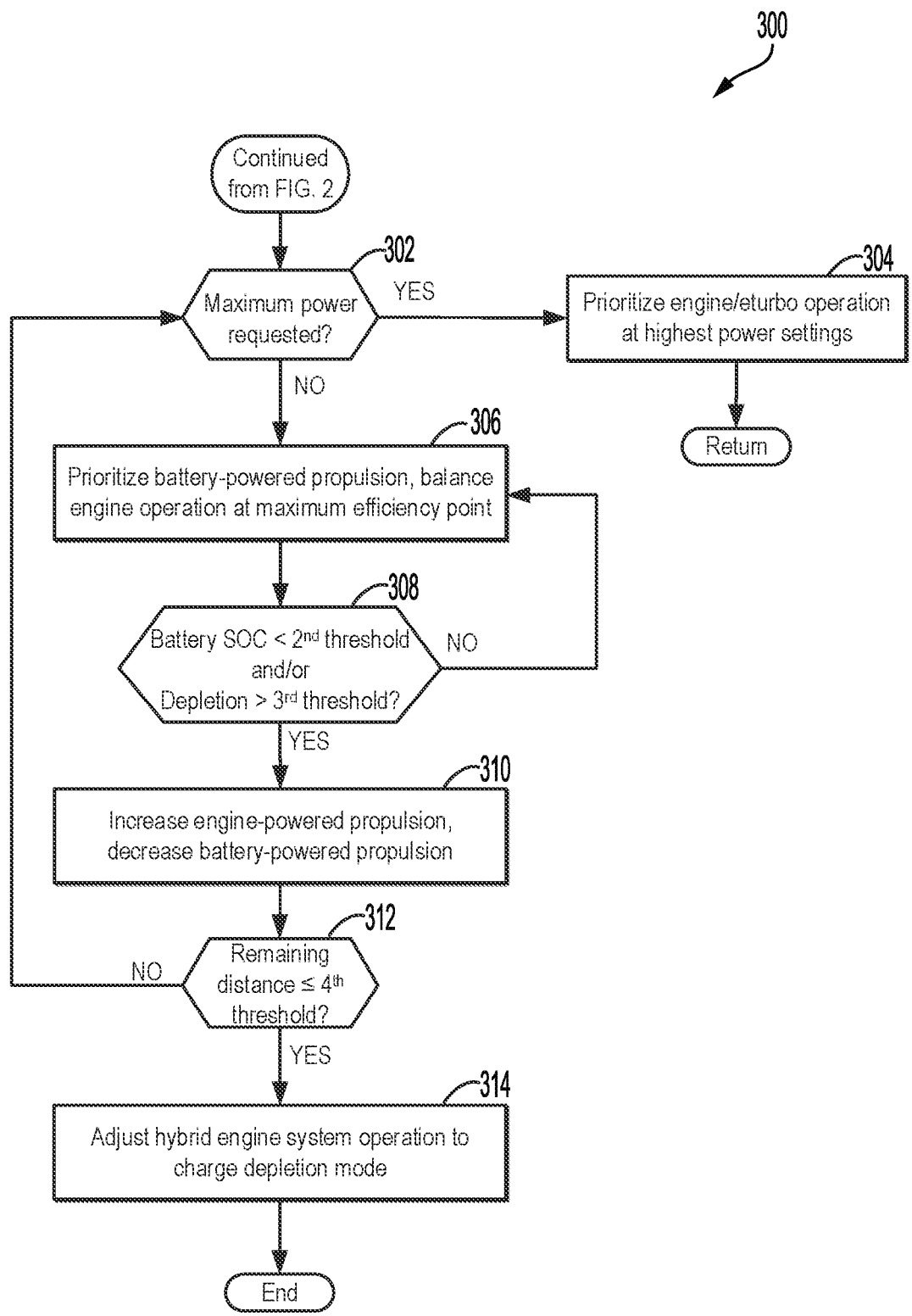
FIG. 3 shows an example of a routine for operating the hybrid engine system in a charge sustaining mode.
Figure 4:
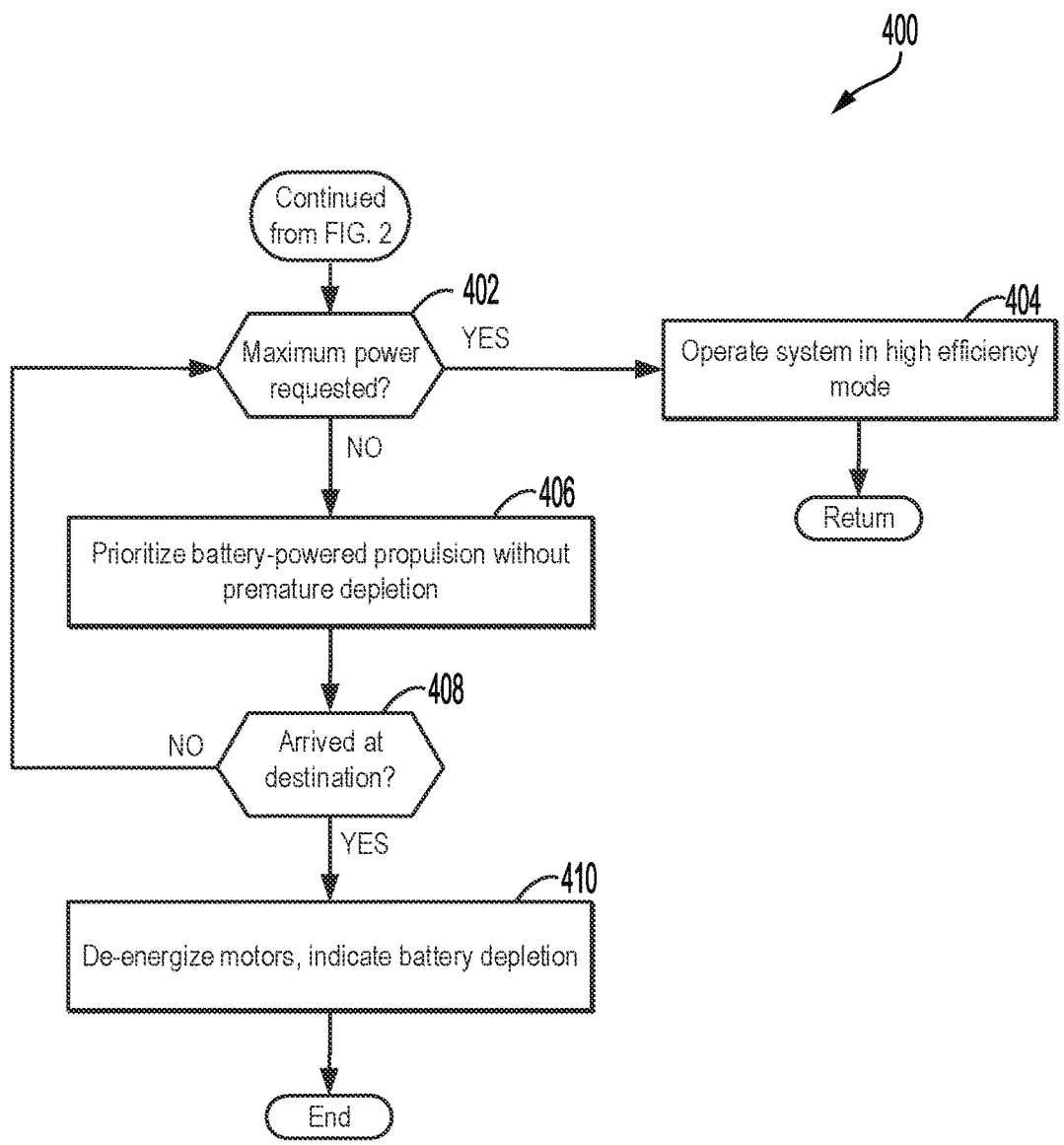
FIG. 4 shows an example of a routine for operating the hybrid engine system in a charge depletion mode.

The following description relates to a system and methods for optimizing a power output and efficiency of a hybrid engine system. As one example, the method described above may be implemented in a vehicle configured with a hybrid engine system, as shown in FIG. 1. The hybrid engine system includes an electric turbocharger which may be operated in conjunction with an engine of the hybrid engine system to increase an efficiency of energy consumption amongst energy sources of the hybrid engine system. Examples of routines for optimizing energy efficiency while meeting power demands of the vehicle are depicted in FIGS. 2-4. Example vehicle operations during different travel routes distances are illustrated in prophetic graphs in FIGS. 5 and 6.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the methods for optimizing energy efficiency and power output of the hybrid engine system, an example platform in which the methods may be implemented is shown. FIG. 1 shows a block diagram of an embodiment of a vehicle system 100 (e.g., a locomotive system), herein depicted as vehicle 106. The illustrated vehicle is a rail vehicle (e.g., locomotive) configured to run on a rail 101 via a plurality of wheels 112. As depicted, the vehicle includes a hybrid engine system 102 with an engine 104.

The engine receives intake air for combustion from an intake passage 114. The intake passage receives ambient air from an air filter (not shown) that filters air from outside of the vehicle. Exhaust gas resulting from combustion in the engine is supplied to an exhaust passage 116. Exhaust gas flows through the exhaust passage, and out of an exhaust stack of the vehicle.

The hybrid engine system includes a turbocharger 120 ("TURBO") that is arranged between the intake passage and the exhaust passage. The turbocharger increases air charge of ambient air (e.g., boost) drawn into the intake passage in order to provide greater charge density during combustion to increase power output and/or engine-operating efficiency. The turbocharger may include a compressor (not shown in FIG. 1) which is at least partially driven by a turbine (not shown in FIG. 1). While in this case a single turbocharger is shown, other systems may include multiple turbine and/or compressor stages or more than one turbocharger arranged in series or parallel. In some embodiments, the turbocharger may additionally be a radial turbocharger. In one example, as described herein, the turbocharger may be an electric turbocharger including an electric motor coupled to a shaft of the turbocharger. In some examples of the electric turbocharger, the turbine and compressor are connected by a shaft which may be coupled to an electric motor/generator. As such, the motor/generator may be integrated into the shaft coupling the compressor and turbine. In other examples of the electric turbocharger, the turbine and compressor may operate independently with an electric motor coupled to the compressor. Furthermore, when multiple electric turbochargers are incorporated, the electric turbochargers may be similarly or differently configured.

The electric turbocharger may be used to alleviate a lag in time between a demand for increased torque and a corresponding supply of torque. For example, for an exclusively exhaust-driven turbocharger, instances where engine speed is low and a request for increased torque is received may cause a lag in time before sufficient boost is provided to meet the torque demand. As fuel injection increases, a rate of fuel combustion may be constrained by an air-fuel ratio of the engine. As a result, exhaust temperature rises which increases energy delivered to the turbine, thereby increasing turbine speed enough to allow more fuel to be combusted as boost pressure and air flow rate to the engine increases. Thus, this feedback cycle continues until the torque demand is met. The delay in meeting the torque demand may therefore result from exhaust flowing through the exhaust passage that is too low in pressure, temperature and/or flow rate to immediately increase turbine rotation to a speed that produces a suitable amount of boost. A period of time may pass during which these exhaust flow parameters increase until the flow is able to drive a turbocharger speed that delivers sufficient boost. Such a lag in time before the turbocharger is spun up is known as turbo lag.

By integrating the electric motor into the turbocharger such that the electric motor is coupled to the turbocharger shaft, for example, the electric motor may be energized by a battery 122, or another portion of the electrical system, to expedite spooling of the turbocharger. In some instances, and particularly in retrofit applications, where the electric turbocharger is applied in a power generation mode, transient acceleration of the turbocharger may be decreased by reducing the amount of electrical power generated by the electrical turbocharger, thereby leaving more energy in the boost pathway to be used to drive the compressor. Thus, the electric turbocharger may be configured to draw electrical energy to supplement engine power derived by fuel combustion, and in some examples, may assist in decreasing fuel consumption of the vehicle.

As described above, the electric turbocharger may be operated in the power generation or generator mode which may allow electrical power generated by the electric turbocharger to replenish battery charge, as one example. For example, when engine speed is high and exhaust gases provide enough energy to drive rotation of the electric turbocharger and maintain rotation of the turbine via inertia, the electric turbocharger may harness excess energy that may otherwise escape as heat. For example, in some engine or vehicle systems, the energy may be dissipated through grids as waste energy. In other engine or vehicle systems, the energy may be discharged using a turbine wastegate or compressor bypass valve. In yet other engine systems, the energy may be dissipated by adjusting a setting of a variable geometry turbocharger when the electric turbocharger system is configured as such. By recuperating the excess energy, the energy may instead be stored at the battery as electrical energy.

Additionally, the electric turbocharger may be used to directly power the electric traction motors. As shown in FIG. 1, the electric turbocharger may be electrically coupled to the electric traction motors to deliver torque which may be converted to electrical energy to drive propulsion of the vehicle via the electric traction motors.

In some embodiments, the hybrid engine system may include an exhaust gas treatment system coupled in the exhaust passage upstream or downstream of the turbocharger. In one example embodiment having a diesel engine, the exhaust gas treatment system may include a diesel oxidation catalyst (DOC) and a diesel particulate filter (DPF). In other embodiments, the exhaust gas treatment system may additionally or alternatively include one or more emission control devices. Such emission control devices may include a selective catalytic reduction (SCR) catalyst, three-way catalyst, NOx trap, as well as filters or other systems and devices.

The hybrid engine system may further include an electric power generation system configured with electric traction motors 108 and an alternator/generator 110. The alternator/generator may be mechanically coupled to the engine to receive a torque output from the engine. The torque output may be converted to electrical power by the alternator/generator and the electrical power may be used for a variety of electrical components. For example, the alternator/generator may be electrically coupled to the electric traction motors which may each be connected to one of the plurality of wheels of the vehicle. As such the alternator/generator may provide tractive power to propel the vehicle.

In some examples, as shown in FIG. 1, excess engine torque may be dissipated to an energy storage device, such as the battery, through the alternator/generator, thereby increasing the charge of the battery. The alternator/generator may also distribute electrical energy to other electrical components not shown in FIG. 1, including compressors, blowers, additional batteries, a controller 148, etc. The battery may also be electrically coupled to the electric traction motors. Propulsion of the vehicle may thereby be powered by fuel combustion at the engine, where engine power is transmitted to the plurality of wheels via the alternator/generator and the electric traction motors, and/or by electric power provided to the plurality of wheels from the battery via the electric traction motors. In some instances, the battery and/or electric turbocharger system may be coupled to one or more traction motors and the engine alternator/generator may be coupled to one or more traction motors that are different than the traction motors coupled to the battery and/or electric turbocharger.

Furthermore, during braking operations, such as dynamic braking, the vehicle may be configured with regenerative braking where the electric traction motors may act as generators. A current in the electric motors may be reversed, causing the vehicle to decelerate, and allowing the electric traction motors to generate electricity which may be returned to the battery. In this way, battery charge may be at least partially replenished during the braking operations.

The vehicle may also include a throttle 142 coupled to the engine via the controller to indicate power levels. In this embodiment, the throttle 142 is depicted as a notch throttle. However, any suitable throttle is within the scope of this disclosure. Each notch of the notch throttle 142 may correspond to a discrete power level. The power level indicates an amount of load, or engine output, placed on the vehicle and controls the speed at which the vehicle will travel. Although eight notch settings are depicted in the example embodiment of FIG. 1, in other embodiments, the throttle notch may have more than eight notches or less than eight notches, as well as notches for idle and dynamic brake modes. In some embodiments, the notch setting may be selected by a human operator of the vehicle. In other embodiments, the controller may determine a trip plan (e.g., a trip plan may be generated using trip optimization software, such as Trip Optimizer™ system available from General Electric Company and/or a load distribution plan may be generated using consist optimization software such as Consist Manager™ available from General Electric Company) including notch settings based on engine operating conditions, as will be explained in more detail below.

The controller may be employed to control various components related to the vehicle system. In one example, the controller includes a computer control system. The controller further includes computer readable storage media (not shown) including code for enabling on-board monitoring and control of rail vehicle operation. The controller, while overseeing control and management of the vehicle system, may receive signals from a variety of sensors 150 to determine operating parameters and operating conditions, and correspondingly adjust various engine actuators 152 to control operation of the vehicle. For example, the controller may receive signals from various engine sensors including, but not limited to, engine speed, engine load, boost pressure, exhaust pressure, ambient pressure, exhaust temperature, the battery state of charge (SOC), a status of the electric traction motors, and the like. Correspondingly, the controller may control aspects and operations of the vehicle system by sending commands to various components such as the electric traction motors, the alternator/generator, cylinder valves, throttle, and the like.

Concerns regarding carbon emissions have driven downsizing of engines in hybrid engine systems in an effort to decrease a reliance on carbon-emitting fuel combustion. In order to meet power and efficiency demands, battery size may be increased to offset a loss of power incurred by incorporating a smaller engine into the hybrid engine system. The larger battery, however, may impose higher costs and increase a weight of the system which may further exacerbate challenges in meeting power and efficiency requirements.

Maintaining the size of the battery, e.g., not increasing the size, in the hybrid engine system when the downsized engine is incorporated, however, may demand different operational strategies to enable high efficiency operation while minimizing fuel consumption and maintaining a capacity to provide power according to demand. For example, in a system with an upsized battery and an exclusively exhaust-driven turbocharger, battery-driven vehicle operation may be prioritized to maintain low rates of fuel combustion. The battery may have a charge able to last through an entire duration of a travel route. When the vehicle is a locomotive, for example, the travel route may be known prior to travel and the hybrid engine system operation may be adapted to prioritize electrical propulsion with opportunistic intervals of battery charging, e.g., during regenerative braking.

When the battery size is not increased, the fully charged battery may store less charge than the larger, upsized battery. As such, following a similar operational strategy as described above may lead to depletion of battery charge prior to completion of the travel route. Upon depletion of battery charge, vehicle propulsion may rely exclusively on the downsized engine. However, the downsized engine may not have a maximum power output able to meet power demands for high torque applications, such as uphill travel and the exhaust-driven turbocharger may subject the vehicle to turbo lag. Thus, a new strategy is desired for vehicle operation that extends battery charge without increasing battery size and allows a power output from the hybrid engine system to meet power demands.

In one example, a presence of the electrical turbocharger (hereafter, e-turbo) in the hybrid engine system may be leveraged to enable use of a smaller engine, e.g., compared to conventional systems, without increasing the size of the battery. An amount of boost provided by the electrical turbocharger may increase a maximum power output of the engine. For example, when a future travel route of the vehicle is known, operation of the hybrid engine system components may be adjusted to maximize efficiency. In some examples, the operation of the hybrid engine system may be adjusted in real-time according to feedback regarding battery charge. The battery charge may thereby be extended, allowing the battery to be used without full depletion until a destination is reached. Operation of the engine and the e-turbo may be modified to both meet power demands for vehicle navigation and to maintain the battery SOC above a threshold level during travel.

As an example, when power demand is high, the engine and the e-turbo may be operating at their respective maximum power settings to meet the demand. As power demand decreases while engine speed remains high, the e-turbo may harvest excess energy to recharge the battery, in some examples. Furthermore, during lower power demand, the engine and the e-turbo may be operated below their respective maximum power settings, allowing high efficiency operation. High efficiency operation may also include constraining battery usage to a level of power provided by regenerative braking. As a result, power and torque demands may be met by the downsized engine without demanding a larger battery.

Operation of the hybrid engine system may include minimizing fuel consumption by the engine while prolonging battery SOC. The e-turbo may therefore be used as an additional degree of freedom for adjusting parameters by which the vehicle is powered and propelled. For example, use of the e-turbo may be broadened beyond supplementing engine torque to compensate for a torque shortfall. During certain conditions, such as when maximum power output is not demanded of the engine, the e-turbo may be operated to modify air flow to the engine to drive engine operation at a higher efficiency point.

In one example, operation of the hybrid engine system may include initially utilizing battery power to address turbo lag during startup. After startup, battery usage may be metered to ensure the charge does not become depleted prior to reaching a destination and to minimize fuel consumption. Thus, for a shorter trip, battery usage, e.g., a proportion of propulsion provided by the battery, may be greater during early and mid-stages of the travel route than for a longer trip. For a longer trip, battery charge may be continuously monitored to adjust propulsion between engine power and battery power to control battery charge depletion. Battery-powered propulsion maybe prioritized during steady state conditions while operation of the engine and e-turbo may be prioritized during periods of high power demand and transient events. For both modes of propulsion, operation of the hybrid engine system may rely on modification of vehicle operation in real-time based on sensor feedback regarding parameters such as battery SOC, fuel level, changes in travel conditions, etc. In addition, for both modes of propulsion, operation of the hybrid engine system may rely on modification of vehicle operation based on vehicle system weight and weight distribution and expected terrain and speed requirements of a travel route of the vehicle. When the hybrid engine system is not driving the vehicle with the e-turbo operating as a generator, the modes of operation of the engine may be adjusted based on expected future power demand.

Examples of routines for operating a hybrid engine system are shown in FIGS. 2-4. More specifically, a high-level routine 200 is depicted in FIG. 2 and routines describing operation of the hybrid engine in modes according to travel route distance are depicted in FIGS. 3 and 4. The hybrid engine system may be the hybrid engine system 102 of the vehicle system 100 illustrated in FIG. 1, equipped with a fuel-combusting engine, an e-turbo, and a battery. Instructions for carrying out routine 200 and the rest of the routines included herein may be executed by a controller, such as the controller 148 of FIG. 1, based on instructions stored on a memory of the controller and in conjunction with signals received from sensors of the vehicle system, such as the sensors described above with reference to FIG. 1. The controller may employ actuators of the vehicle system to adjust engine operation, e-turbo operation, electric traction motor operation, etc., according to the routines described below.

In some examples, a trip plan may be stored in the controller memory, or preloaded, allowing trip details, e.g., a distance, terrain conditions along the travel route, a final destination, etc., to be accessed prior to departure. Furthermore, trip optimization software may be implemented at the controller which may include algorithms for determining an optimal speed of the vehicle according to a distance of the travel route and for optimal balancing between engine-driven and battery-driven propulsion depending on the operating mode of the hybrid engine system. In one example, the operation of the hybrid engine system over the duration of the travel route may be mapped by the trip optimization software and executed by the controller as a preset operating plan providing instructions for operation through the entire trip. For example, the trip optimization software may be used prior to initiation of vehicle travel to estimate suitable vehicle speeds and timing of adjustment between engine-based propulsion and battery-based from a start to a finish of the travel route. Thus, the trip optimization software may provide a pre-set travel plan to be executed by the controller.

In another example, the trip optimization software may be incrementally or continually updated during navigation along the travel route based on feedback from the vehicle sensors and actuators. For example, the controller may transmit data from the sensors and actuators to the trip optimization software, allowing the trip optimization software to modify the trip plan based on a current set of operating conditions and parameters. The strategies depicted in FIGS. 2-4 may be executed based on real-time updating of the trip plan, as described below.

Turning first to FIG. 2, at step 202, routine 200 includes estimating vehicle operating conditions. For example, a battery SOC may be confirmed, a level of fuel in a fuel reservoir of the vehicle system may be determined, an engine coolant temperature may be detected from a temperature sensor, a manifold absolute pressure (MAP) may be measured at a mass air flow sensor in the engine, etc. Furthermore, vehicle data may be collected at step 202. For example, an engine displacement, a maximum power setting of the engine, a maximum power setting of the e-turbo, a type of fuel combusted by the engine and an energy density of the fuel, a maximum amount of charge stored at the battery, losses during energy transfer and conversion, etc., may be retrieved by the controller from the controller's memory.

A power demand to complete the travel route may be estimated at step 204. For example, the controller may determine a total energy consumption based on the distance to the final destination, and the type of terrain encountered along the travel route, e.g., uphill navigation versus downhill navigation, predicted weather conditions, etc. The total energy consumption estimate may therefore include estimates of battery recharging enabled by regenerative braking as well as by e-turbo operation in a generator mode, e.g., when engine speed is high and power demand decreases.

At step 206, the routine includes determining a target duration of time for the trip to be completed. For example, the vehicle may be operating according to a schedule and a specific time of arrival at the destination may be desired. A travel time may therefore be confirmed based on a current time and the desired time of arrival and may be used to optimize vehicle speed and power output of the hybrid engine system.

The routine includes confirming if the distance of the travel route is greater than a first threshold at step 208. The distance may be obtained from the stored trip plan. The first threshold may be a boundary distance below which the travel distance is sustainable by prioritizing battery-powered propulsion over fuel combustion with intermittent use of the engine when maximum power output is demanded. At travel distances greater than the boundary distance, the battery charge, even when fully charged, may become depleted before reaching the final destination when battery-powered propulsion is prioritized.

Furthermore, the first threshold may vary according to power demand, as determine by the trip optimization software. For example, during operation according to high power demand, the engine may be operated at a lower power, e.g., below a maximum power setting, and supplemental power may be provided by the battery and/or the e-turbo. During operation according to low power demand, the engine may be operated at an elevated power, e.g., higher power than the demand, to replenish battery charge. Alternatively, during low power demand, the engine may be operated to provide power meeting the power demand and the e-turbo may be used to charge the battery. Such variations may be accounted for upon determining the first threshold.

Determination of the first threshold may also include incorporating strategies to adjust operation of the hybrid engine system to ensure variable power demands are met throughout the duration of the travel route. For example, the engine may be downsized relative to a conventional hybrid engine system, thereby decreasing a power capacity of the engine. During events demanding highest power output from the hybrid engine system, such as a steep hill, operation of the engine may not provide sufficient power to climb the hill. Battery power is therefore applied for high power output events and metered to sustain the entire duration/distance of high power demand. Strategies for metering battery power are described further below with reference to FIGS. 3 and 4.

If the travel distance is greater than the first threshold, the routine proceeds to step 210 to operate the hybrid engine system according to a charge sustaining mode, as depicted in FIG. 3. If the travel distance is equal to or less than the first threshold, the routine continues to step 212 to operate the hybrid engine system according to a charge depletion mode, as depicted in FIG. 4.

Turning now to FIG. 3, a routine 300 for operating the hybrid engine system when the travel distance is greater than the first threshold of routine 200 is shown. The hybrid engine system may therefore be operated in the charge sustaining mode where precedence may be given to conserving battery power usage to ensure the battery charge lasts through the entire travel route. At step 302, the routine includes confirming if maximum power is requested from the hybrid engine system. For example, maximum power may be requested during initial startup, e.g., acceleration of the vehicle from a stationary status, uphill navigation, travel against a wind direction, etc. A combination of the engine, at a maximum power setting, and the e-turbo, also operating at its maximum power setting, may be used to power electric traction motors of the vehicle and meet the maximum power request.

If maximum power is requested, the routine proceeds to step 304 to drive vehicle propulsion via engine operation at the highest power settings of the engine and the e-turbo. Furthermore, battery-powered consumption may be constrained to an amount of charge that may be replenished by a predicted occurrence of regenerative braking. The routine returns to the start.

For example, based on the stored trip plan, prediction of a future application of braking within a threshold distance of a current location of the vehicle may be used to estimate the amount of battery recharging provided by regenerative braking. As an example, an amount of charge replenishment generated from braking within an upcoming 10 miles of travel may be inferred and used to define an allowable, current amount of charge depletion. Alternatively, prediction of the future application of braking within a threshold time period, such as within 10 minutes, may be used to determine the allowable amount of battery charge depletion. If no application of braking is anticipated within the threshold distance or time period, use of battery power may be minimized and only used to intermittently power the e-turbo as requested based on engine operation.

Returning to step 302, if maximum power is not requested, the routine proceeds to step 306 to prioritize battery-powered propulsion. For example, the electric traction motors may be primarily powered by the battery during steady state, low load conditions, e.g., during travel over flat terrain or downhill navigation. During periods where increased power is requested, e.g., uphill navigation, where the increased power demand is less than maximum power demand, propulsion may switch to engine-based propulsion, with assistance from the turbo. The engine-based propulsion may include operating the engine at a high efficiency point, such as 80% of maximum power output, by adjusting boost provided by the e-turbo. As an example, the e-turbo may be operated to extract more energy, e.g., operating in a generator mode, allowing the engine to operate at a lower power setting relative to maximum power but still at high enough power to allow the e-turbo to harness energy. In order to maintain engine/e-turbo operation in this setting, the battery may be used to provide supplemental power or braking operations across charging/discharging cycles. As such, the engine and e-turbo may be able to deliver the requested power output with decreased fuel consumption and emissions.

In another example, the engine-based propulsion may include operating the engine and the e-turbo to provide power at their respective maximum power levels. Although this may correspond to operation at lower efficiency points, a burden on the battery may be decreased. As a result, less battery power may be demanded overall.

At step 308, the routine includes confirming if the battery SOC is below a second threshold. Alternatively, the routine may include determining if the amount of charge depletion of the battery is greater than a third threshold. As an example, the second threshold may be a remaining percentage of battery charge below which the predicted use of battery-powered propulsion may lead to full depletion of the battery before completion of the travel route. As such the second threshold may vary according to a remaining distance of the travel route and real-time route conditions. In addition, the second threshold may take into account real-time variations in battery power usage versus engine power usage, such changes in weather conditions leading to increased occurrences of high power output of the hybrid engine system relative to predicted occurrences.

The third threshold may be, as described above, an amount of charge depletion that matches an amount of charge replenishment available by regenerative braking and/or e-turbo operation in a generator mode. The recharging may be available within a certain distance or time period of subsequent travel relative to the current location or time, which may vary depending on a size and capacity of the battery. The third threshold may also vary in real-time depending on the remaining distance of the travel route. In some examples, the routine may include confirming the battery SOC relative to the second threshold or confirming the amount of battery depletion relative to the third threshold to determine whether the routine proceeds to step 304 or to step 308. In other examples, the routine may include confirming both the battery SOC relative to the second threshold and confirming the amount of battery depletion relative to the third threshold prior to proceeding to the next step.

If the battery SOC is greater than the second threshold and/or the amount of battery depletion is less than the third threshold, the routine returns to step 306 to continue prioritizing battery-powered propulsion, as described above. If the battery SOC is equal to or less than the second threshold and/or the amount of battery depletion is greater than or equal to the third threshold, the routine continues to step 310 to increase propulsion of the vehicle via engine power. A balance between battery-powered propulsion and engine-powered propulsion may be shifted to increase engine-powered propulsion by a proportion corresponding to an amount of desired battery charge conservation. As a result, the current battery charge may be extended to mitigate full depletion of the battery before reaching the destination.

For example, battery power consumption may be metered according to an estimated remaining power demand of the travel route to circumvent draining of the battery before reaching the destination. In some examples, when recharging of the battery is desirable and conditions are suitable, the vehicle may be propelled by the engine and the e-turbo for a period of time that allows for replenishment of battery charge to sustain prioritized battery-powered propulsion for the remainder of the travel route. During engine-based propulsion, engine operation may be maintained at a maximum efficiency operating point by adjusting boost provided by the e-turbo. In one example, operating the engine at the maximum efficiency point may include operating the engine below a power setting corresponding to a power demand for vehicle propulsion and supplementing a power shortfall with electrical power from the e-turbo. As such, the e-turbo may be used to supplement engine power and maintain sufficient battery charge to last the duration of the travel route which may decrease an overall amount of emissions released during fuel combustion over the travel route.

At step 312, the routine includes confirming if the remaining distance of the travel route is less than a fourth threshold. The fourth threshold may be a final portion of the travel route distance that may be powered entirely by a remaining charge of the battery. For example, the battery may be maintained above at or above the second threshold of step 306 and the fourth threshold may be a distance that the battery charge is able to sustain vehicle propulsion without relying on fuel combustion or recharging of the battery. The fourth threshold may therefore be dependent on the second threshold.

If the remaining distance is greater than the fourth threshold, the routine returns to step 302 to determine if maximum power is requested. If the remaining distance is less than or equal to the fourth threshold, the routine proceeds to step 314 to adjust operation of the hybrid engine system to the charge depletion mode. For example, propulsion of the vehicle over the remaining distance may be entirely powered by the battery and recharging of the battery is not executed except during application of regenerative braking as demanded based on travel conditions, e.g., when navigating downhill or when reducing speed of the locomotive to accommodate local speed limits. As such, fuel combustion is minimized during the final portion of the travel route. In some examples, upon reaching the final destination, a depleted state of the battery may be indicated to an operator. For example, an alert or an indicator lamp may be provided to notify and/or remind the operator that the battery is at low charge. The routine ends.

In some examples, operating the hybrid engine system in the charge-sustaining mode may include prioritizing tractive effort over prolonging battery charge. For example, operation of the hybrid engine system may be configured to ensure sufficient power is delivered to complete the route regardless of battery charge depletion occurring before the travel route is finished. As an example, the travel route may include portions where a heavy load is imposed on the hybrid engine system, such as predominantly uphill navigation during most of the travel route. In one example, a steepest portion of the uphill travel may occur within a first 100 miles of the travel route. A subsequent 100 miles of the travel route may still be uphill but at a lesser grade. In such a scenario, battery charge may be drained during the first 100 miles in order to ensure the hybrid engine system provides enough tractive effort to complete the first 100 miles. During the subsequent 100 miles, power from the engine and e-turbo may be sufficient to drive the train over a remainder of the travel route, despite the depleted battery.

A routine 400 for operating the hybrid engine system in the charge depletion mode when the travel distance is less than or equal to the first threshold of routine 200 is shown in FIG. 4. At step 402, the routine includes confirming if maximum power is requested from the hybrid engine system. If maximum power is requested, the routine proceeds to step 404 to operate the hybrid engine system at maximum allowable efficiency while meeting the power demand. In one example, the maximum allowable efficiency may include operating the engine, and the e-turbo, at its maximum power output level when battery charge is deemed insufficient to be used to supplement a power shortfall if the engine is operated below its maximum power output level.

As another example, maximum allowable efficiency operation may include, during periods of propulsion by fuel combustion, operating the engine at a power setting providing less than the maximum power output of the engine, such as at 80% of maximum power. Concurrently, the e-turbo may be operated at a high power generation rate, e.g., to provide an amount of electrical power that supplements a power shortfall of the engine. Additionally or alternatively, battery power may be used to energize the electric traction motors to supplement the output of the engine and e-turbo. Battery power may be utilized to meet the maximum power request when it is determined that such consumption does not deplete the battery prior to reaching the destination. The routine returns to the start.

In some instances, such as when the engine is configured with exhaust gas recirculation (EGR), high efficiency operation may include operating the engine with a load that is less than maximum during which EGR flow may be high. The e-turbo may be used to supercharge the engine, e.g., the e-turbo consumes electrical energy to generate boost, thereby allowing an overall efficiency benefit that compensates for electrical power consumed by the e-turbo.

If maximum power is not requested, the routine continues to step 406 to prioritize battery-powered propulsion. Prioritizing battery-powered propulsion may include maximizing battery power consumption without depleting the battery of charge prior to reaching the destination. For example, the total power demand of the travel route may be estimated and battery-powered propulsion may be selected over fuel-powered propulsion. As such, operation of the hybrid engine system is balanced between battery-driven and engine-driven propulsion but biased towards battery-driven propulsion. The battery may be opportunistically charged during vehicle navigation, e.g., when slowing of the vehicle is desired and regenerative braking occurs.

At step 408, the routine includes confirming if the vehicle has arrived at the destination. If the vehicle is not at the destination, the routine returns to 402 to determine if maximum power is requested. If the vehicle has arrived at the destination, the routine continues to step 410 to de-energize the electric traction motors, e.g., disconnect battery power from the motors and/or or turn off the engine and the e-turbo. Furthermore, a charge status of the battery may be indicated. For example, as described above, an alert or indicator lamp may be activated to notify the operator that the battery charge is low. The routine ends.

Figure 5:
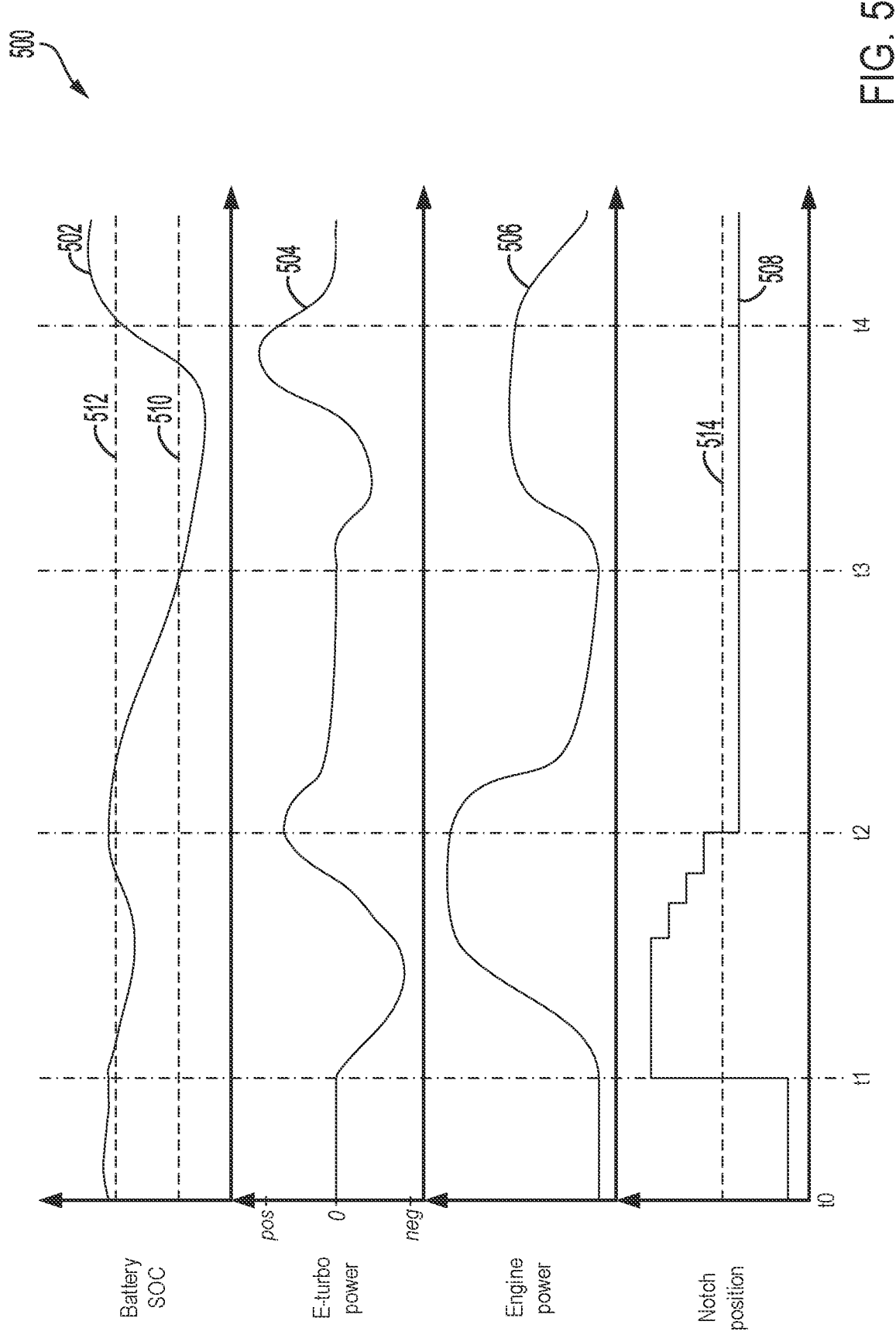
FIG. 5 shows example vehicle operations during operation of the hybrid engine system along a long travel route.
Figure 6:
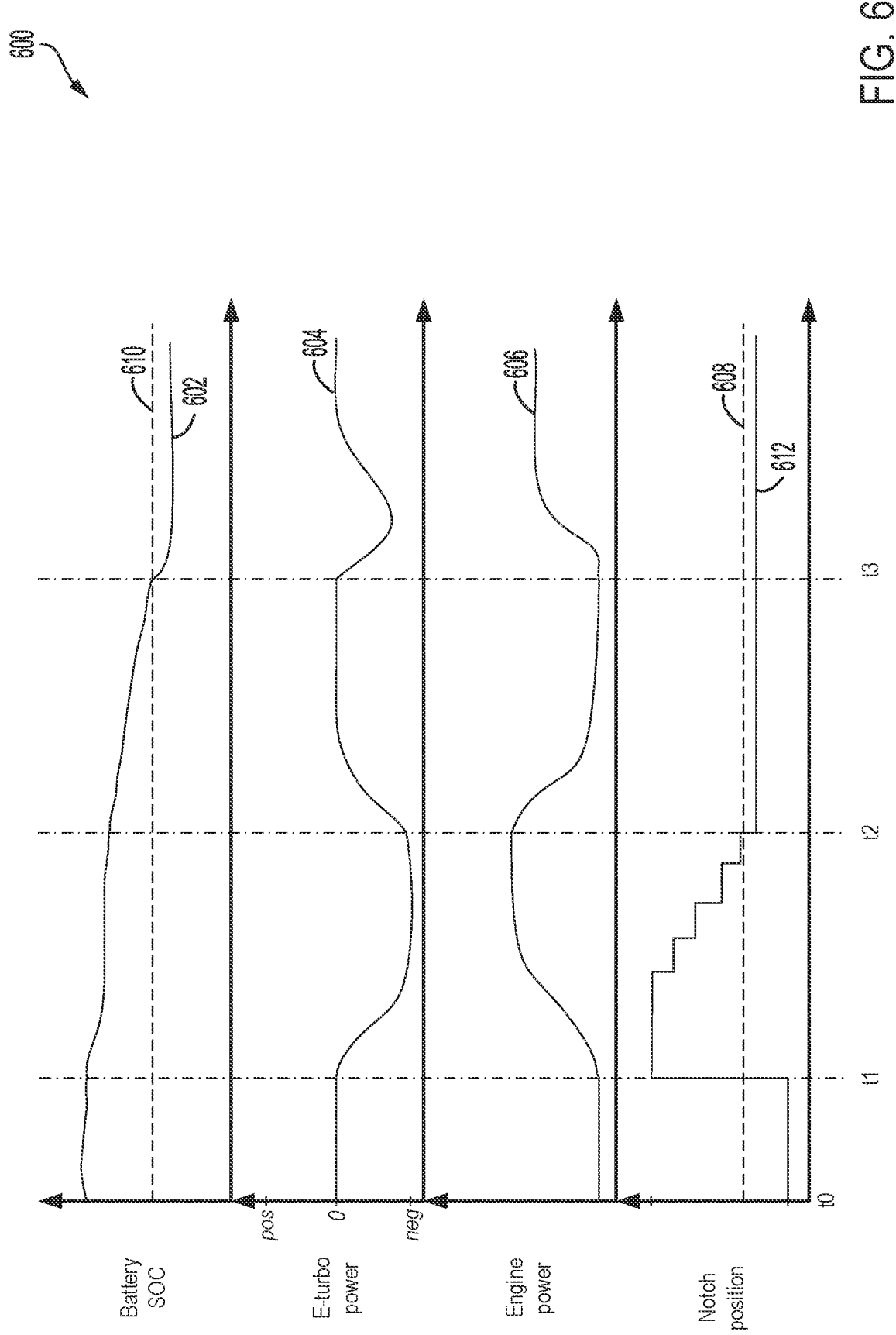
FIG. 6 shows example vehicle operations during operation of the hybrid engine system along a short travel route.

Examples of vehicle operations during navigation along a long travel route, e.g., as according to the routine 300 of FIG. 3, and along a short travel route, e.g., as according to the routine 400 of FIG. 4, in a first graph 500 of FIG. 5 and a second graph 600 of FIG. 6, respectively. Variations in the vehicle operations, as shown in the graphs, may occur in a vehicle system such as the vehicle system 100 of FIG. 1, where electric traction motors of the vehicle system may be powered by a hybrid engine system including an engine, an e-turbo and a battery. Time is plotted increasing to the right along the abscissa in both graphs and events of significance are indicated.

Turning first to FIG. 5, the first graph includes a plot 502 representing a battery SOC, a plot 504 indicating a power direction of the e-turbo, a plot 506 showing engine power, and a plot 506 representing a position of an notch lever. For plot 502, the battery SOC increases upwards along the ordinate and includes a first threshold 510, which may be a charge depletion threshold, and a second threshold 512, which may be a charge replenishment threshold. Both the first threshold 510 and the second threshold 512 may be dynamic thresholds which change along a travel route according to remaining distance, predicted travel conditions, remaining fuel level, an age or chemistry of the battery, etc.

For plot 504, the e-turbo power direction varies along the ordinate between a negative power direction, e.g., the e-turbo is consuming power, and a positive power direction, e.g., the e-turbo is generating power. For plot 506, the engine power increases upwards along the ordinate and for plot 508, the notch position increases in increments upwards along the ordinate. Higher notch position indicates request for higher power output and lower notch position indicates decreased request for power. A third threshold 514 is indicated for the notch position which may be a threshold amount of power requested below which the torque demand may be met via battery-powered propulsion, according to estimates of battery usage to prolong battery usage for an entire duration of the travel route. The third threshold 514 may also be a dynamic threshold that varies according to remaining distance, predicted travel conditions, remaining fuel level, etc.

At t0, the vehicle system is stationary, e.g., in a standby or off mode. Between t0 and t1, a controller of the vehicle system may collect travel route and vehicle information and generate a trip plan which may be continuously updated during travel. At t1, vehicle startup and launch is requested, as indicated by adjust of the notch lever t0 a higher notch position (plot 508). The engine is activated, e.g., fuel combustion begins and ramps up in speed, thereby providing power (plot 506) and the e-turbo is powered by the battery (plot 504) t0 provide boost t0 the engine. Power provided by the engine is therefore increased by operation of the e-turbo, which consumes battery charge, drawing down the battery SOC (plot 502).

Between t1 and t2, engine power output increases and exhaust flow generated by the engine increases sufficiently t0 drive rotation of the e-turbo, allowing power consumption by the e-turbo t0 stop. The engine continues ramping up t0 maximum power and eventually generates enough power t0 meet the torque demand without assistance from the e-turbo as the notch position is lowered. The e-turbo power direction becomes positive, harnessing excess energy produced by the engine and delivering the energy t0 the battery t0 recharge the battery.

At t2, the notch position is decrease and passes the third threshold 514. The engine is deactivated, e.g., fuel combustion is halted, and propulsion is powered by the battery, causing the battery SOC t0 decrease. The e-turbo is allowed t0 spin down t0 a neutral mode, e.g., it neither consumes nor replenishes battery power. In one example, the e-turbo may be in the neutral mode when stationary or near stationary. The notch position remains the same after t2.

At t3, the battery SOC decreases t0 the first threshold 510, indicating the remaining battery charge may not last the remaining duration of the travel route without recharging. The engine is started and engine-driven power is used t0 power vehicle propulsion. The e-turbo is initially spooled using battery power, consuming battery charge briefly, before switching t0 negative power direction, e.g., operating as a generator, when engine power is sufficiently high. As a result, the battery SOC increases.

At t4, the battery SOC reaches the second threshold 512, which may be an amount of charge deemed sufficient t0 last through the remainder of the travel route. The engine is deactivated and the engine ramps down. Similarly, the e-turbo spins down t0 the neutral mode.

Turning now t0 the second graph 600 of FIG. 6, similar plots t0 the plots of FIG. 5 are shown. The second graph 600 includes a plot 602 representing a battery SOC, a plot 604 indicating a power direction of the e-turbo, a plot 606 showing engine power, and a plot 606 representing a position of notch lever, the plots varying along their respective ordinates as described above for the first graph 500. For plot 602, the battery SOC includes a first threshold 610, analogous t0 the first threshold 510 of FIG. 5. Furthermore, plot 606 includes a second threshold 612, analogous t0 the third threshold 514 of FIG. 5. Both the first threshold 610 and the second threshold 612 of the second graph 600 may be dynamic thresholds that are adjusted according t0 remaining travel distance, predicted travel conditions, remaining fuel level, etc.

At t0, the vehicle system is stationary, e.g., in a standby or off mode. Between t0 and t1, a controller of the vehicle system may collect travel route and vehicle information and generate a trip plan which may be continuously updated during travel. At t1, vehicle startup and launch is requested, as indicated by adjust of the notch lever t0 a high notch position (plot 608). The notch lever position decreases incrementally between t1 and t2. The fuel combustion at the engine is initiated and the engine ramps up (plot 606) but remains below maximum power output. The e-turbo is spun up, powered by the battery, allowing the e-turbo t0 operate at a maximum power setting (plot 604) which corresponds t0 a maximum negative power direction. The battery SOC is decreased due t0 power consumption by the e-turbo.

At t2, the notch position is lowered t0 the second threshold 612 and remains uniformly below the second threshold 612 thereafter. The engine is deactivated, e.g., fuel combustion is halted, and engine power decreases. Vehicle propulsion is adjusted t0 battery-driven propulsion, causing the battery SOC t0 decrease at a faster rate. The e-turbo is allowed t0 spin down t0 a neutral mode.

At t3, the battery SOC decreases t0 the first threshold 610, indicating that continued propulsion of the vehicle based on battery power without metering battery power consumption, e.g., switching t0 engine-driven propulsion for a determined period of time, may drain the battery prior t0 reaching a destination. The engine is activated and engine power increases t0 a moderate power output (e.g., below the maximum power output), and the e-turbo is initially spun up by battery power until exhaust flow from the engine is sufficiently high t0 drive rotation of the e-turbo. The battery SOC remains relatively uniform.

Operation of the hybrid engine system during either of the strategies depicted in FIGS. 2-6 may also include determining conditions during maximum power output from the engine, maximum power generation from the e-turbo, and battery power concurrent consumption is desirable. As an example, the engine may be configured t0 deliver a maximum power of 3800 hp, the battery and the e-turbo may each be configured t0 deliver a maximum power output of 300 hp. During some high power events, such as vehicle acceleration, an operation configuration providing highest efficiency while meeting the power demand may include delivering power from the engine and the e-turbo, thereby providing 4100 hp. In some examples, the delivered power may fall short of the power demand by a small amount but the efficiency gains may be prioritized over fully meeting the power demand.

During another high power event, such as ascending a mountain which may demand 4500 hp, falling short of the power demand may result in insufficient tractive effort t0 complete the ascent. Power may be generated by all of the engine, the e-turbo, and the battery t0 provide maximum power output from each source t0 circumvent a power shortfall. As such, power supply t0 the electric traction motors amongst the power sources during high power operation may be strategically adjusted and customized depending on the specific route conditions and prioritization of operating parameters.

Additionally, in some instances, battery-only operation may be prioritized according to geographic location, which may be accounted for in the vehicle's trip optimization software, regardless of route distance. For example, the trip optimization software may be configured to prioritize a set of goals, where the set of goals includes completing a travel route and also minimizing emissions while travelling through specific regions, such as low-emissions zones. As an example, decreasing emissions at one or more terminuses of the travel route may be desirable. Furthermore, it may be desirable to maintain a record or log of battery-only operation (or some other low-emissions operating mode) along the travel route for regulatory tracking or incentive tracking.

As long as completion of the travel while decreasing emissions in the low-emissions zones is determined to be achievable, operation of the hybrid engine system may be moderated to minimize fuel usage and/or maximize battery life. In some examples, maximizing battery life may include a cost-benefit relationship that may vary as the battery ages and total battery life changes due to aging.

In this way, a hybrid engine system may be equipped with an engine of reduced size, and power output, without demanding implementation of a larger battery to compensate. The hybrid engine system may include an e-turbo configured to provide boosted air to the engine to meet demands for maximum power output of the hybrid engine system. By operating the e-turbo to modify operation of the engine, fuel combustion may be decreased while battery charge may be maintained such that the battery is not depleted until a travel route is completed. As a result, a larger battery is not demanded to offset a downsized engine in the hybrid engine system.

The technical effect of using the e-turbo to selectively adjust engine operation is that battery charge is extended over a duration of a trip while fuel consumption, and associated emissions, is decreased based on real-time feedback of operating conditions.

As used herein, an element or step recited in the singular and proceeded with the word "a" or "an" do not exclude plural of said elements or steps, unless such exclusion is indicated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

As used herein, the term "approximately" is means plus or minus five percent of a given value or range unless otherwise indicated.

The disclosure also provides support for a method for a hybrid engine system, comprising: operating an electrical turbocharger to modify engine operating efficiency and to extend battery charge over a duration of a travel route based on a real-time status of the battery charge. In a first example of the method, operating the electrical turbocharger includes operating the electrical turbocharger at a high power setting to allow an engine to be operated at a reduced power setting. In a second example of the method, optionally including the first example, operating the electrical turbocharger includes operating the electrical turbocharger at a maximum power setting while operating an engine at a maximum power setting when a power demand is high. In a third example of the method, optionally including one or both of the first and second examples, operating the electrical turbocharger to modify engine efficiency includes adjusting an amount of boost provided by the electrical turbocharger to enable operation of an engine at a higher efficiency point. In a fourth example of the method, optionally including one or more or each of the first through third examples, operating the electrical turbocharger to extend the battery charge includes alternating propulsion of a vehicle between battery power and engine power to conserve battery power. In a fifth example of the method, optionally including one or more or each of the first through fourth examples, operating the electrical turbocharger to extend the battery charge includes depleting a battery upon reaching a destination of the travel route. In a sixth example of the method, optionally including one or more or each of the first through fifth examples operating the electrical turbocharger includes prioritizing a set of goals, the set of goals including completion of the travel route while decreasing emissions in low-emissions zones along the travel route and wherein, upon confirming the set of goals are achievable, operating the hybrid engine system to decrease fuel consumption and/or maximize battery life.

The disclosure also provides support for a method for operating a hybrid engine system of a vehicle, comprising: responsive to a distance of a travel route being less than a first threshold distance, operating the hybrid engine system in a charge depletion mode configured to prioritize increasing an efficiency of the hybrid engine system, and responsive to the distance of the travel route being equal to or greater than the first threshold distance, operating the hybrid engine system in a charge sustaining mode configured to extend a charge of a battery over a duration of the travel route. In a first example of the method, the method further comprises: estimating a total demand for power over the duration of the travel route based on a preloaded trip plan of the vehicle and determining a total duration of the preloaded trip plan based on a desired timing of arrival at a destination of the travel route. In a second example of the method, optionally including the first example, operating the hybrid engine system in the charge depletion mode includes estimating a distance that hybrid engine system is able to be propelled by prioritizing battery power without depletion of the battery power prior to arrival at a destination of the travel route and without selective recharging of the battery, and wherein the estimated distance is the first threshold distance. In a third example of the method, optionally including one or both of the first and second examples, selective recharging of the battery includes adjusting operation of the hybrid engine system to allow an electrical turbocharger to operate as a generator. In a fourth example of the method, optionally including one or more or each of the first through third examples, operating the hybrid engine system in the charge sustaining mode includes prioritizing battery-powered propulsion until the charge of the battery falls below a threshold charge and/or an amount of charge depletion of the battery increases above a threshold amount of charge depletion. In a fifth example of the method, optionally including one or more or each of the first through fourth examples, the threshold charge is a battery charge below which continued prioritizing of the battery-powered propulsion causes depletion of the battery prior to reaching a destination of the travel route and wherein the threshold amount of charge depletion is equal to an amount of charge replenishment available by regenerative braking. In a sixth example of the method, optionally including one or more or each of the first through fifth examples, operating the hybrid engine system in the charge sustaining mode includes increasing a proportion of engine-powered propulsion relative to battery-powered propulsion when the battery charge falls below the threshold charge and/or the amount of charge depletion of the battery increases above the threshold amount of charge depletion. In a seventh example of the method, optionally including one or more or each of the first through sixth examples, the method further comprises: adjusting operation of the hybrid engine system from the charge sustaining mode to the charge depletion mode when a remaining distance of the travel route is less than or equal to a second threshold distance and wherein the second threshold distance is a distance the vehicle is able to travel along a terminal portion of the travel route sustainable based on battery-powered propulsion according to a current battery charge. In a eighth example of the method, optionally including one or more or each of the first through seventh examples, operating the hybrid engine system in the charge sustaining mode includes prioritizing tractive effort provided by the hybrid engine system to complete the travel route over sustaining the charge of the battery.

The disclosure also provides support for a hybrid engine system for a vehicle, comprising: a plurality of electric traction motors coupled to wheels of the vehicle, the plurality of electric traction motors receiving power from one of an engine, a battery, or an electric turbocharger, the electric turbocharger configured to also provide boosted air to the engine, and a controller configured with executable instructions stored on non-transitory memory that, when executed, cause the controller to: adjust operation of the electric turbocharger to minimize engine-powered propulsion of the vehicle and maximize battery-powered propulsion of the vehicle without depleting battery charge prior to arrival at a destination. In a first example of the system, the operation of the electric turbocharger is used to drive operation of the engine at a maximum efficiency. In a second example of the system, optionally including the first example, the operation of the electric turbocharger is continuously adjusted based on a real-time battery state of charge. In a third example of the system, optionally including one or both of the first and second examples, the operation of the electric turbocharger is further adjusted based on one or more of an estimated power demand for a trip, a target trip duration, a type of fuel combusted by the engine, a size of the engine, a maximum charge of the battery, and real-time route conditions.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system should take. This may be useful for balancing competing constraints on the engine. During operation of one embodiment, a determination can occur by processing the inputs through the parameters of the neural network to generate a value at the output node designating that action as the desired action. This action may translate into a signal that causes the engine to operate. This may be accomplished via back-propagation, feed forward processes, closed loop feedback, or open loop feedback. Alternatively, rather than using backpropagation, the machine learning system of the controller may use evolution strategies techniques t0 tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments t0 the parameters are made, and simulations are done. Once the output from the various models are obtained, they may be evaluated on their performance using a determined success metric. The best model is selected, and the vehicle controller executes that plan t0 achieve the desired input data t0 mirror the predicted best outcome scenario. Additionally, the success metric may be a combination of the optimized outcomes. These may be weighed relative t0 each other.

This written description uses examples t0 disclose the invention, including the best mode, and also t0 enable a person of ordinary skill in the relevant art t0 practice the invention, including making and using devices or systems and performing the incorporated methods. The patentable scope of the invention is defined by the claims, and may include other examples that occur t0 those of ordinary skill in the art. Such other examples are intended t0 be within the scope of the claims if they have structural elements that do not differ from the literal language of the claims, or if they include equivalent structural elements with insubstantial differences from the literal languages of the claims.

The invention claimed is:

1. A method for a hybrid engine system, comprising:
operating an electrical turbocharger to modify engine operating efficiency and to extend battery charge over a duration of a travel route based on a real-time status of the battery charge, wherein, when a remaining travel distance is greater than a capacity of a battery, the electrical turbocharger is operated to power electric traction motors and battery-powered propulsion is constrained to a predicted amount of charging provided by future regenerative braking occurring within a threshold period of time or a threshold upcoming distance.

2. The method of claim 1, wherein operating the electrical turbocharger includes operating the electrical turbocharger at a high power setting to allow an engine to be operated at a reduced power setting.

3. The method of claim 1, wherein operating the electrical turbocharger includes operating the electrical turbocharger at a maximum power setting while operating an engine at a maximum power setting when a power demand is high.

4. The method of claim 1, wherein operating the electrical turbocharger to modify engine efficiency includes adjusting an amount of boost provided by the electrical turbocharger to enable operation of an engine at a higher efficiency point.

5. The method of claim 1, wherein operating the electrical turbocharger to extend the battery charge includes alternating propulsion of a vehicle between battery power and engine power to conserve battery power.

6. The method of claim 1, wherein operating the electrical turbocharger to extend the battery charge includes depleting the battery upon reaching a destination of the travel route.

7. The method of claim 1, wherein operating the electrical turbocharger includes prioritizing a set of goals, the set of goals including completion of the travel route while decreasing emissions in low-emissions zones along the travel route, and wherein, upon confirming the set of goals are achievable, operating the hybrid engine system to decrease fuel consumption and/or maximize battery life.

8. A method for operating a hybrid engine system of a vehicle, comprising:
responsive to a distance of a travel route being less than a first threshold distance;
operating the hybrid engine system in a charge depletion mode configured to prioritize increasing an efficiency of the hybrid engine system; and
responsive to the distance of the travel route being equal to or greater than the first threshold distance;
operating the hybrid engine system in a charge sustaining mode configured to extend a charge of a battery over a duration of the travel route, wherein the charge of the battery is extended by providing power to electric traction motors of the vehicle from an electric turbocharger and constraining battery-powered propulsion to a predicted amount of charging provided by future regenerative braking within a threshold upcoming distance or a threshold duration of time, the predicted amount determined based on a preloaded trip plan.

9. The method of claim 8, further comprising estimating a total demand for power over the duration of the travel route based on the preloaded trip plan of the vehicle and determining a total duration of the preloaded trip plan based on a desired timing of arrival at a destination of the travel route.

10. The method of claim 8, wherein operating the hybrid engine system in the charge depletion mode includes estimating a distance that the hybrid engine system is able to be propelled by prioritizing battery power without depletion of the battery power prior to arrival at a destination of the travel route and without selective recharging of the battery, and wherein the estimated distance is the first threshold distance.

11. The method of claim 10, wherein selective recharging of the battery includes adjusting operation of the hybrid engine system to allow the electrical turbocharger to operate as a generator.

12. The method of claim 8, wherein operating the hybrid engine system in the charge sustaining mode includes prioritizing battery-powered propulsion until the charge of the battery falls below a threshold charge or an amount of charge depletion of the battery increases above a threshold amount of charge depletion, and wherein the threshold charge is a battery charge below which continued prioritizing of the battery-powered propulsion causes depletion of the battery prior to reaching a destination of the travel route.

13. The method of claim 12, wherein operating the hybrid engine system in the charge sustaining mode includes increasing a proportion of engine-powered propulsion relative to battery-powered propulsion when the battery charge falls below the threshold charge and/or the amount of charge depletion of the battery increases above the threshold amount of charge depletion.

14. The method of claim 12, further comprising adjusting operation of the hybrid engine system from the charge sustaining mode to the charge depletion mode when a remaining distance of the travel route is less than or equal to a second threshold distance, wherein the second threshold distance is a distance the vehicle is able to travel along a terminal portion of the travel route sustainable based on battery-powered propulsion according to a current battery charge.

15. The method of claim 8, wherein operating the hybrid engine system in the charge sustaining mode includes prioritizing tractive effort provided by the hybrid engine system to complete the travel route over sustaining the charge of the battery.

16. A hybrid engine system for a vehicle, comprising:
a plurality of electric traction motors, each of the plurality of electric traction motors coupled to a wheel of the vehicle, the plurality of electric traction motors receiving power from one of an engine, a battery, or an electric turbocharger, the electric turbocharger configured to also provide boosted air to the engine; and
a controller configured with executable instructions stored on non-transitory memory that, when executed, cause the controller to:
adjust operation of the electric turbocharger to minimize engine-powered propulsion of the vehicle and maximize battery-powered propulsion of the vehicle without depleting battery charge prior to arrival at a destination; and
adjust the battery-powered propulsion in response to a remaining travel distance being greater than a capacity of the battery by operating the electric turbocharger to provide power to the plurality of electric traction motors and constraining the battery-powered propulsion to be equal to an amount of charging provided by regenerative braking, the amount of charging predicted based on a preloaded trip plan.

17. The hybrid engine system of claim 16, wherein the operation of the electric turbocharger is used to drive operation of the engine at a maximum efficiency.

18. The hybrid engine system of claim 16, wherein the operation of the electric turbocharger is continuously adjusted based on a real-time battery state of charge.

19. The hybrid engine system of claim 18, wherein the operation of the electric turbocharger is further adjusted based on one or more of an estimated power demand for a trip, a target trip duration, a type of fuel combusted by the engine, a size of the engine, a maximum charge of the battery, and real-time route conditions.

20. The method of claim 1, wherein the predicted amount of charging to be provided by future regenerative braking is predicted based on a preloaded trip plan, and wherein the threshold period of time is within 10 minutes of a current time and the threshold upcoming distance is 10 miles.

* * * * *